United States Patent
Mahajan et al.

(10) Patent No.: US 11,360,953 B2
(45) Date of Patent: Jun. 14, 2022

(54) TECHNIQUES FOR DATABASE ENTRIES DE-DUPLICATION

(71) Applicant: Hitachi Vantara LLC, Santa Clara, CA (US)

(72) Inventors: Rohit Mahajan, Iselin, NJ (US); Winnie Cheng, West New York, NJ (US)

(73) Assignee: HITACHI VANTARA LLC, Santa Clara, CA (US)

( * ) Notice: Subject to any disclaimer, the term of this patent is extended or adjusted under 35 U.S.C. 154(b) by 32 days.

(21) Appl. No.: 16/938,207

(22) Filed: Jul. 24, 2020

(65) Prior Publication Data

US 2021/0026820 A1 Jan. 28, 2021

Related U.S. Application Data

(60) Provisional application No. 62/878,923, filed on Jul. 26, 2019.

(51) Int. Cl.
*G06F 16/21* (2019.01)
*G06F 16/215* (2019.01)
*G06F 16/901* (2019.01)
*G06N 7/02* (2006.01)
*G06F 16/951* (2019.01)
*G06N 20/00* (2019.01)
*G06F 16/28* (2019.01)

(52) U.S. Cl.
CPC .......... *G06F 16/215* (2019.01); *G06F 16/285* (2019.01); *G06F 16/9024* (2019.01); *G06F 16/951* (2019.01); *G06N 7/023* (2013.01); *G06N 20/00* (2019.01)

(58) Field of Classification Search
CPC ..................................................... G06F 16/215
USPC ........................................................ 707/741
See application file for complete search history.

(56) References Cited

U.S. PATENT DOCUMENTS

| | | | |
|---|---|---|---|
| 7,200,604 B2 | 4/2007 | Forman et al. | |
| 8,214,517 B2 | 7/2012 | Dubnicki et al. | |
| 8,280,926 B2 | 10/2012 | Sandorfi et al. | |
| 8,832,547 B2 * | 9/2014 | Gibson | G06F 40/177 715/234 |
| 9,405,763 B2 | 8/2016 | Prahlad et al. | |
| 10,114,908 B2 * | 10/2018 | Parkkinen | G06F 16/2272 |
| 10,275,397 B2 | 4/2019 | Zhang et al. | |
| 2003/0101449 A1 | 5/2003 | Bentolila et al. | |
| 2008/0005106 A1 | 1/2008 | Schumacher et al. | |

(Continued)

OTHER PUBLICATIONS

International Search Report and Written Opinion of International Searching Authority for PCT/US2020/043451, ISA/RU, Moscow, Russia, dated Oct. 27, 2020.

*Primary Examiner* — Syling Yen
(74) *Attorney, Agent, or Firm* — Mattingly & Malur, PC (57) ABSTRACT

A system and method for data entries deduplication are provided. The method includes indexing an input data set, wherein the input data set is in a tabular formant and the indexing includes providing a unique Row identifier (RowID), wherein rows are the data entries; computing attribute similarity for each column across each pair of rows; computing, for each pair of rows, row-to-row similarity as a weighted sum of attribute similarities; clustering pairs of rows based on their row-to-row similarities; and providing an output data set including at least the clustered pairs of rows.

17 Claims, 9 Drawing Sheets

(56) References Cited

U.S. PATENT DOCUMENTS

| | | | |
|---|---|---|---|
| 2008/0140707 A1* | 6/2008 | Lang | G06F 16/2237 |
| 2010/0106724 A1 | 4/2010 | Anderson | |
| 2010/0250501 A1 | 9/2010 | Mandagere et al. | |
| 2015/0199363 A1* | 7/2015 | Morton | G06F 16/24 |
| | | | 707/722 |
| 2017/0017571 A1 | 1/2017 | Choi et al. | |
| 2019/0102441 A1* | 4/2019 | Malak | G06K 9/6215 |

* cited by examiner

| Record Number | First Name | Last Name | Area Code |
|---|---|---|---|
| 1 | Lisa | Henderson | 914 |
| 2 | Elizabeth | Henderson | 914 |
| 3 | Lisa | Smith | 415 |
| 4 | Mike | Henderson | 914 |
| 5 | Mike | Smith | 650 |

FIG. 2B

| Record Number | First Name | Last Name | Area Code |
|---|---|---|---|
| 1 | Lisa | Henderson | 914 |
| 2 | Elizabeth | Henderson | 914 |
| 3 | Lisa | Smith | 415 |
| 4 | Mike | Henderson | 914 |
| 5 | Mike | Smith | 650 |

| RowID | LastName | FirstName | Address1 | Address2 | ... | CLUSTER | CLUSTER_ANCHOR | CONFIDENCE |
|---|---|---|---|---|---|---|---|---|
| 23497 | jimenez | arianna | 555 capitol mall | ste 1425 | | 1 | 23496 | 80 |
| 23496 | jimenez | arianna | 555 capitol mall | ste 1425 | | 1 | 23496 | 100 |
| 83726 | mcdonnell | william r | national city corp | 1900 e ninth st, loc #01-2172 | | 2 | 51472 | 60 |
| 27163 | waddle | allen c | national city corp | 1900 e ninth st, loc #01-2172 | | 2 | 51472 | 80 |
| 51472 | waddle | allen c | national city corp | 1900 e ninth st, loc #01-2172 | | 2 | 51472 | 100 |
| 25938 | klieman | candace | po box 3103\ | | | 3 | 25938 | 100 |
| 28346 | klieman | candace | po box 3103\ | | | 3 | 25938 | 70 |

TECHNIQUES FOR DATABASE ENTRIES DE-DUPLICATION

CROSS-REFERENCE TO RELATED APPLICATIONS

This application claims the benefit of U.S. Provisional Application No. 62/878,923 filed on Jul. 26, 2019, the contents of which are hereby incorporated by reference.

TECHNICAL FIELD

The present disclosure relates generally to database systems and, more specifically, to a deduplication-method for removing redundant database entries.

BACKGROUND

Deduplication is a process by which duplicate, redundant, or otherwise unnecessary entries or records of a database may be eliminated. If, for example, a database contains two or more entries having similar attributes (e.g., the same or very similar contact information in a customer database), a deduplication process may ensure that the identified information is stored on physical media only one time.

Many database-management systems (DBMS) provide a deduplication engine to eliminate duplicate entities. However, such deduplication engines typically identify entries that either exactly match or partially substantially match. As such, these deduplication engines require a user to confirm the duplicate entries before removal from the database or merging with another entity. As such, the current deduplication solutions are not designed to scale up and handle databases (or other data sources) that include millions of records.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for data entries deduplication. The method comprises indexing an input data set, wherein the input data set is in a tabular formant and the indexing includes providing a unique Row identifier (RowID), wherein rows are the data entries; computing attribute similarity for each column across each pair of rows; computing, for each pair of rows, row-to-row similarity as a weighted sum of attribute similarities; clustering pairs of rows based on their row-to-row similarities; and providing an output data set including at least the clustered pairs of rows.

Certain embodiments disclosed herein include a system for data entries deduplication. The system comprises a processing circuitry; and a memory, the memory containing instructions that, when executed by the processing circuitry, configure the system to: index an input data set, wherein the input data set is in a tabular formant and the indexing includes providing a unique row identifier (ID); compute attribute similarity for each column across each pair of rows; compute, for each pair of rows, row-to-row similarity as a weighted sum of attribute similarities; cluster pairs of rows based on their row-to-row similarities; and provide an output data set including at least the clustered data entries and clustered data entries.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural, and vice-versa, with no loss of generality. In the drawings, like numerals refer to like parts through several views.

Some example embodiments include a method and system for deduplicating data entries in a database source. A data source may include a relational database, a Non-SQL type of database, such as, as examples and without limitation, MongoDB, a data lake, a data warehouse, a data stream, and the like. A data entry may include a data record, an event, a data block, and the like. The disclosed method is based on the creation of a multi-layer entity graph and the execution of one or more machine learning algorithms on each created graph to identify duplicates.

For sake of simplicity, the disclosure will be presented with a reference to a specific example embodiment where the duplicated entries include contact information. However, the disclosed embodiments may be applicable to any type of information contained in such entries. In an embodiment, the method disclosed herein can identify relationships between data entries.

Figure 1:
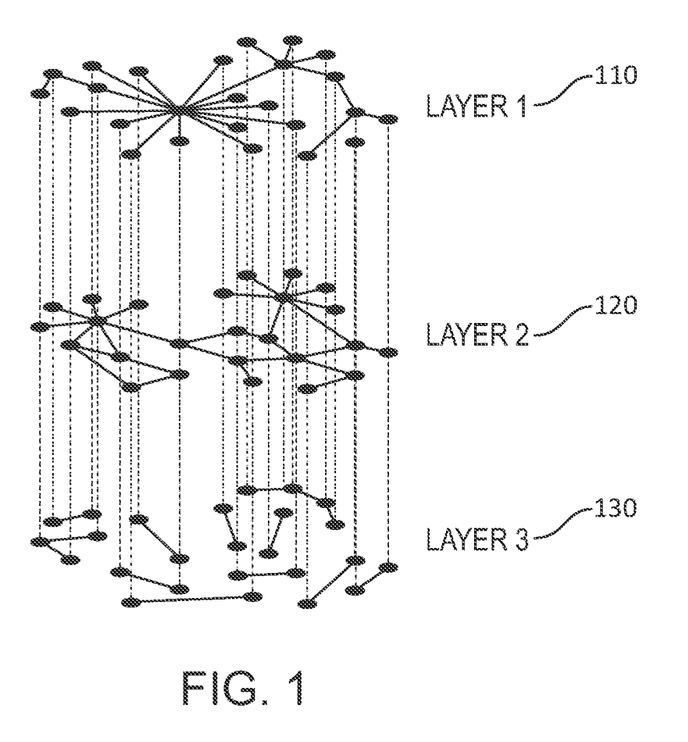
FIG. 1 is a multi-layer entity graph demonstrating relationships between data entries.
Figure 2A:
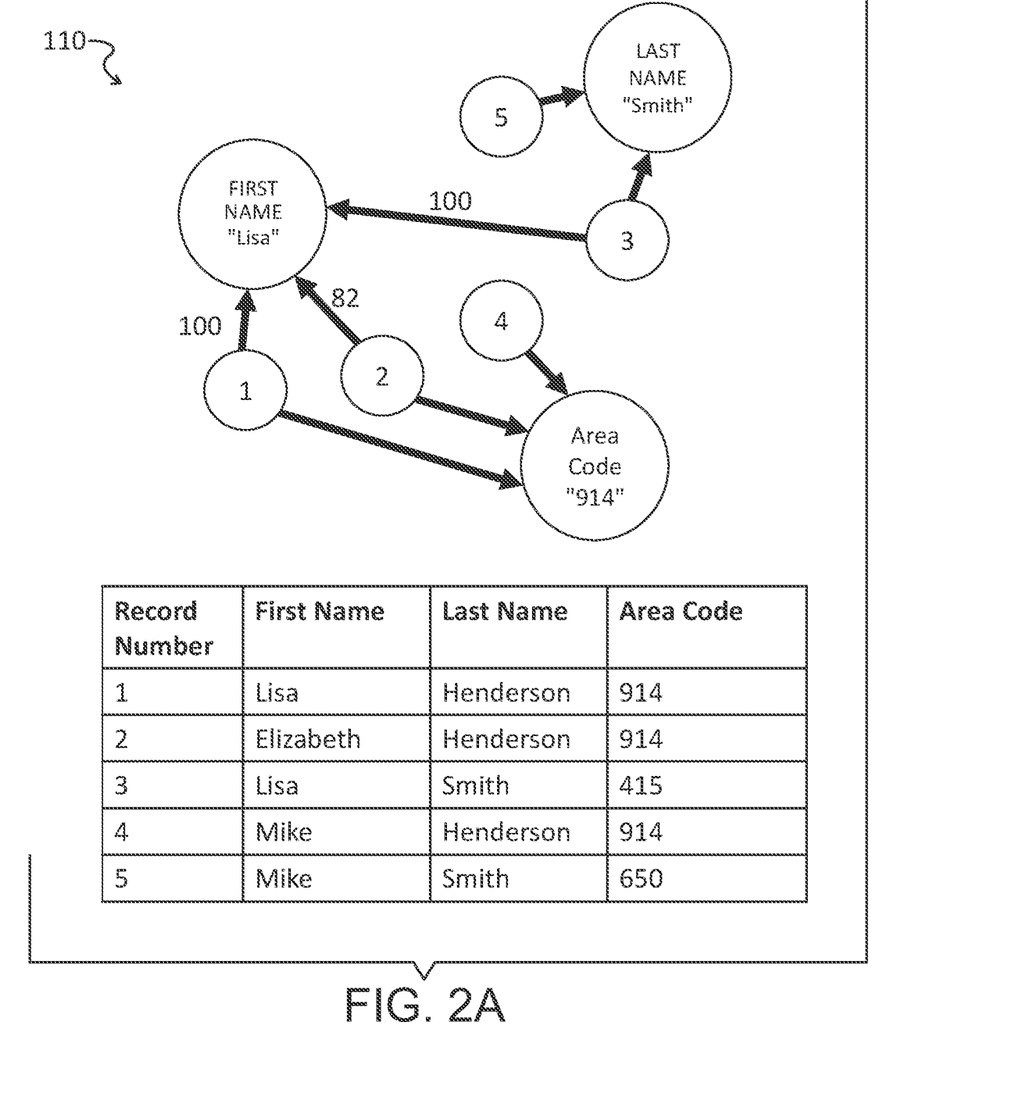
FIGS. 2A, 2B, and 2C demonstrate the respective layers of the multi-layer entity graph of FIG. 1.

In an embodiment shown in FIG. 1, the multi-layer entity graph includes three layers. The first layer 110 demonstrates how the entities (rows) relate on a given attribute (column). The first layer 110 is further illustrated in FIG. 2A. Different comparators are available to generate a similarity score. Such comparators include, but are not limited to, fuzzy comparison, prefix weighted, case insensitive exact match, and the like.

Figure 2B:
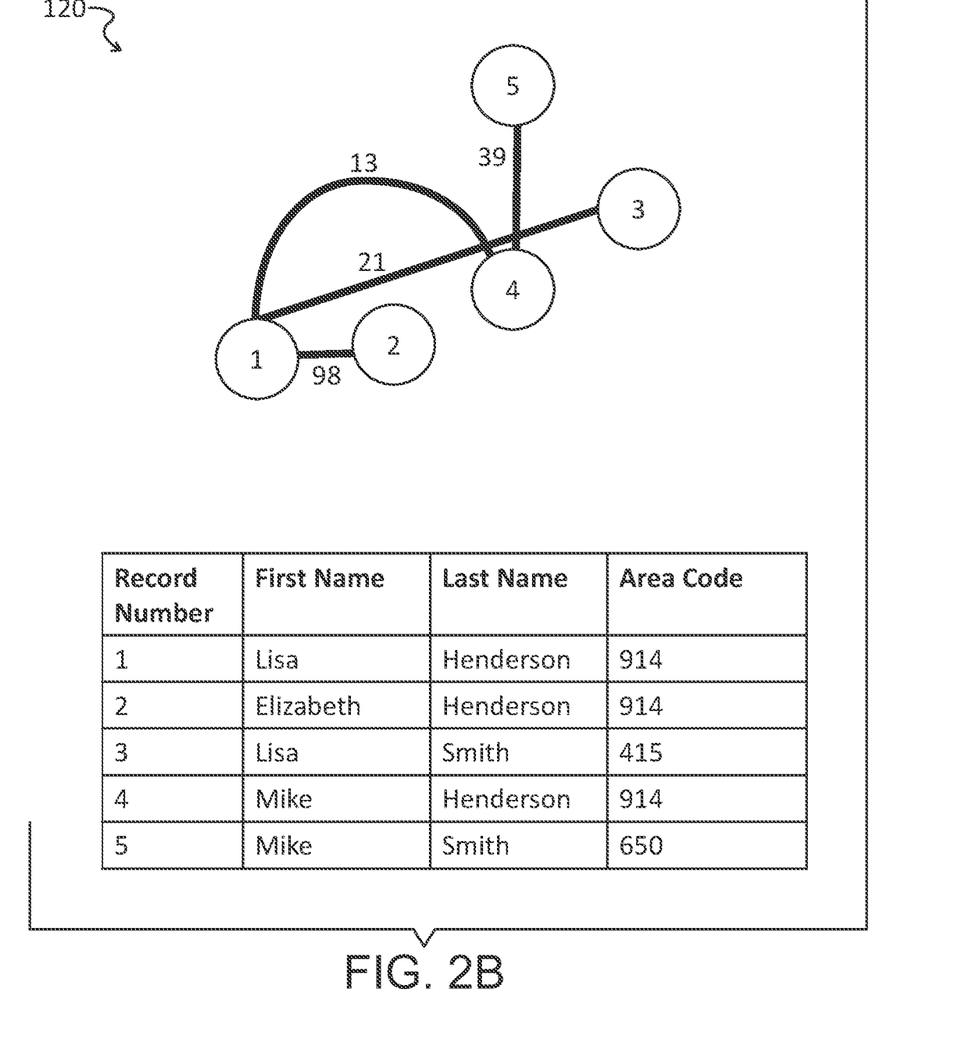

The second layer 120 defines how one entity relates to the other records. The second layer 120 is further illustrated in FIG. 2B. In an embodiment, the record-to-record relationships in this layer are based on collective scores of attribute relationships. In an embodiment, a machine learning process computes the relative importance of different attributes in determining duplicates and further provides an equation for generating the collective score. Such processes may also consider users' feedback explicitly and implicitly to optimize the scores.

Figure 2C:
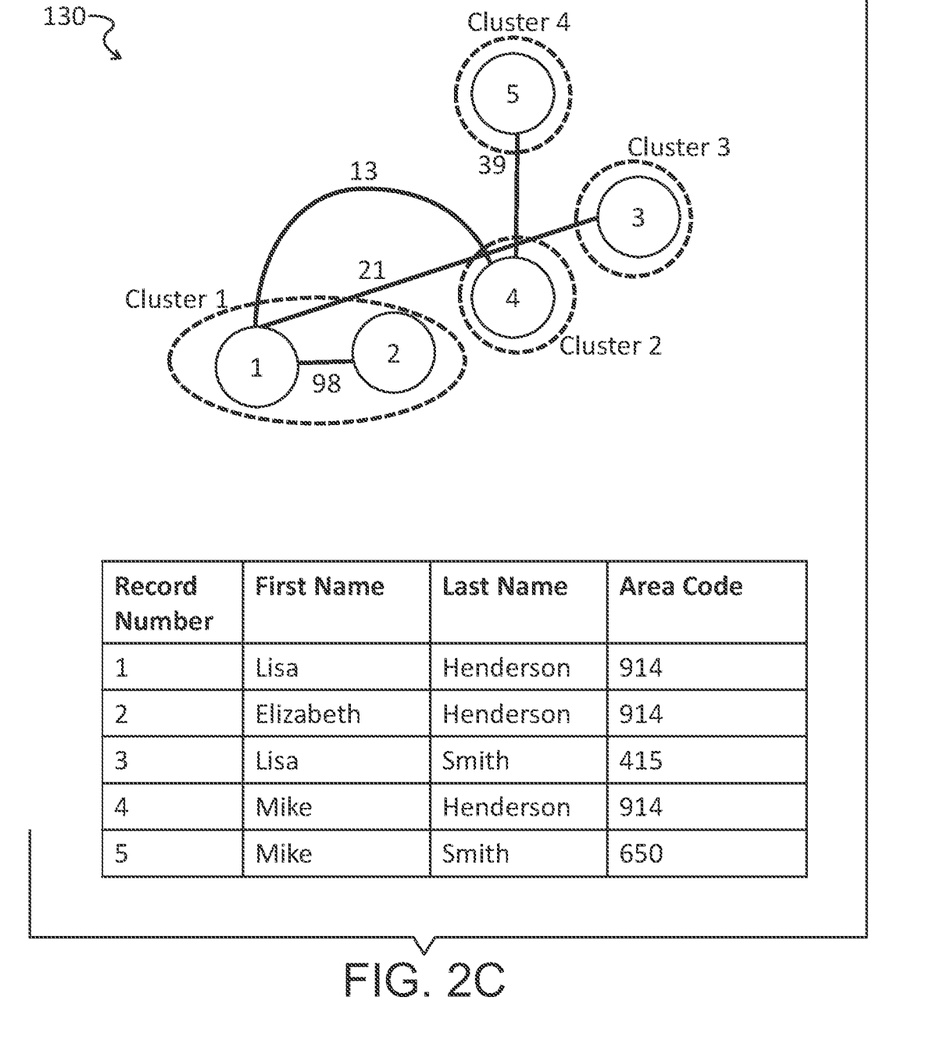

The third layer 130 defines how one group of records relates to the other groups. The third layer 130 is further illustrated in FIG. 2C. Here, a clustering process, discussed below, merges similar entities/records into clusters. The clustering is performed iteratively to track the similarity among one cluster and the others, and to determine the best candidates to merge.

Figure 3:
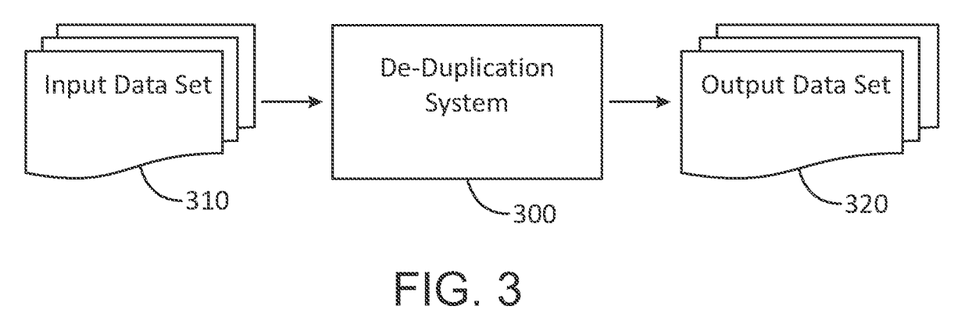
FIG. 3 is an example diagram utilized to explain the operation of a system for deduplicating data entries in a database source.

FIG. 3 is an example diagram illustrating an input/output to a system 300 executing a duplication-detection process according to an embodiment. In an embodiment, an input into the system is an input data set 310, which may include any file storing tabular data, such as numbers and text, in plain text, such as in a comma-separated value (CSV) file, a pointer to a table in a database, or any other source of structured data. An output data set 320 of the system 300 is the result of the deduplication process. In an embodiment, the output data set 320 may be in the format of a tabular file or a graphical representation.

Figure 4A:
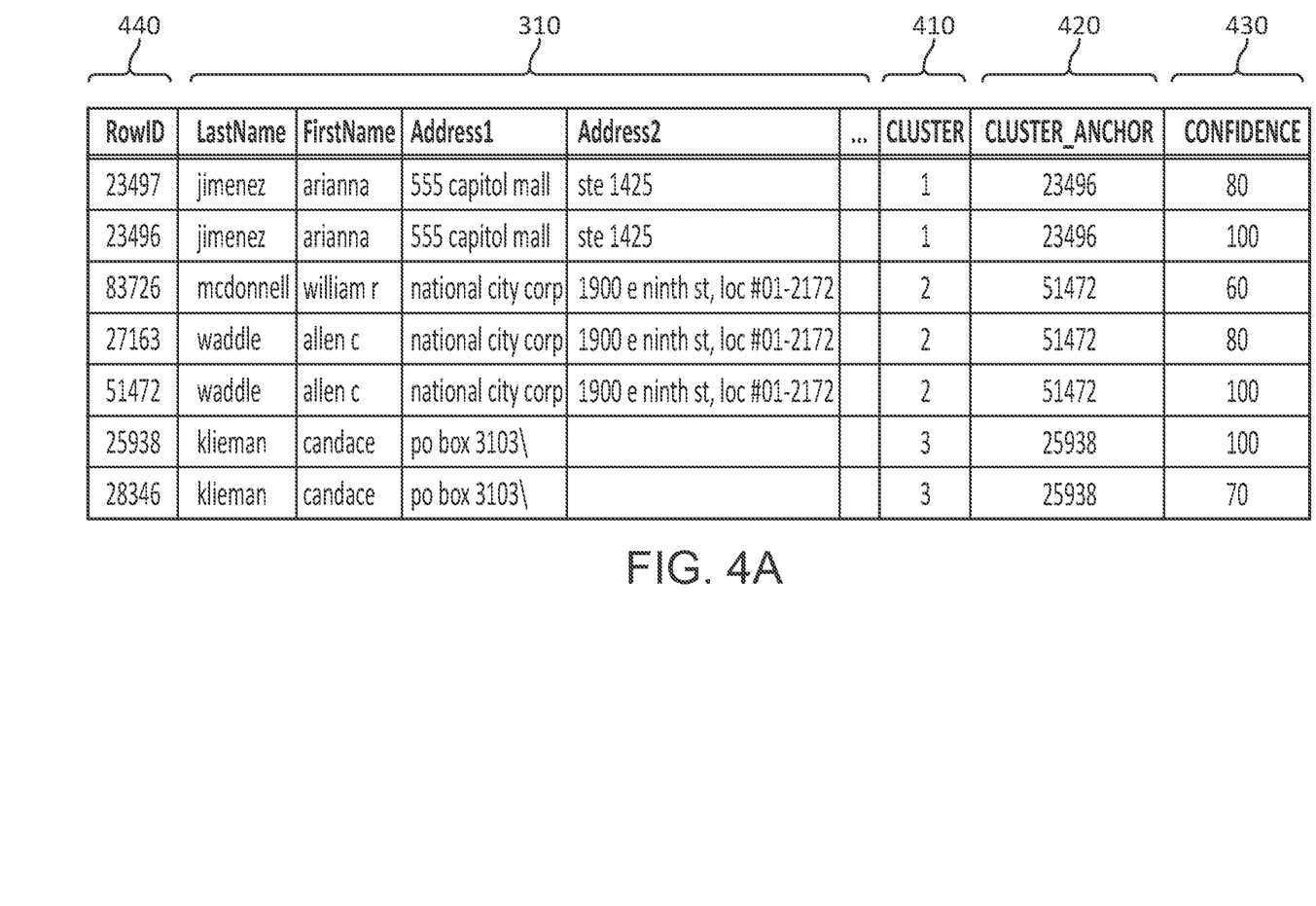
FIGS. 4A and 4B illustrate various formats of an output data set.

Specifically, the tabular format may be a file, such as a CSV file, which includes, among other columns, the input data set 310, a cluster column, a cluster anchor column, and a confidence column. The cluster column indicates the deduplicated group that the row belongs to, the cluster anchor defines the Row identifier ("RowID") of a reference or main row of the cluster, and the confidence column defines a confidence score describing the confidence or likelihood that the row belongs to the cluster, based on relative similarity to the cluster anchor. An example tabular format 410 of the output data set 320 is shown in FIG. 4A. The output data set 320 shows an input data set 310, a cluster column 410, a cluster anchor 420, and a confidence column 430. The RowID 440 is also included in the output data set 320.

As demonstrated in FIG. 4A, the rows having RowIDs "23497" and "23496" are duplicated and, thus, are mapped to the same cluster, "1," and the respective cluster anchor is "23496," which is the RowID of the same duplicated row.

Figure 4B:
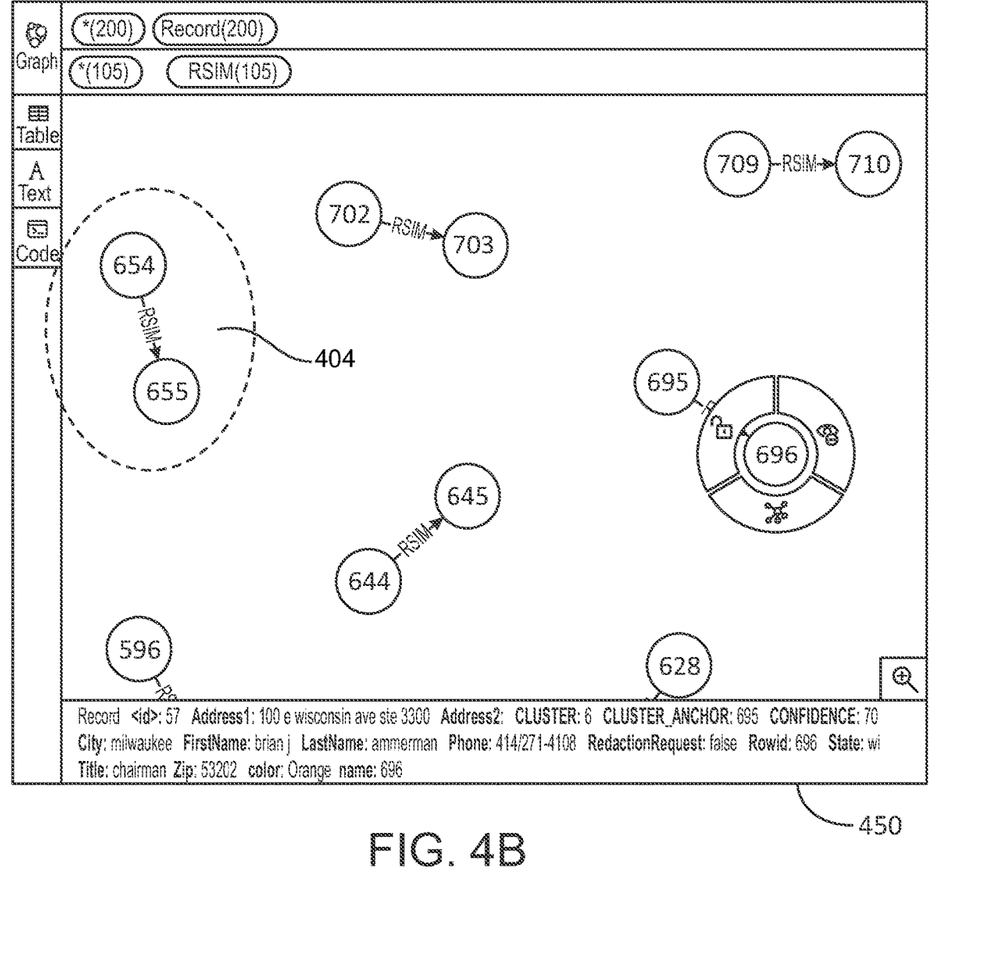

An example for a graphical format showing the various clusters is provided in FIG. 4B. Every node in the graph is the RowID and the connection between two nodes creates a cluster, such as the cluster 404, labeled in FIG. 4B. A user can click on or hover over a cluster to view the particulars of the cluster. This information is displayed in a window 450 labeled in FIG. 4B. It should be noted that FIGS. 4A and 4B relate to two different data sets.

The input data set 310 can be retrieved, pulled, or obtained from a data source. The output data set 310 can be retrieved, pulled, or obtained from a data source, where the data source may be the same as, or different from, the source of the input data set 310. The data source may include a relational database, a Non-SQL type of database, such as, as an example and without limitation, MongoDB®, a data lake, a data warehouse, a data stream, and the like. A data store, such as a database, may be a local system, a remote system, or a hybrid remote-local system. Further, a data source may be configured as a full-physical system, including exclusively physical components, as a virtualized system, including virtualized components, or as a hybrid physical-virtual system.

The system 300 may be realized a virtual machine, a physical machine, or combination thereof. An example block diagram of the system 300 is provided in FIG. 6, below. The system 300 may be deployed in a cloud computing platform, a datacenter, or on-premises. The cloud computing platform may include, for example, a public cloud, a private cloud, or a hybrid cloud. In other configurations, the system 300 may be integrated in a database server storing the input data set and/or the output data set.

Figure 5:
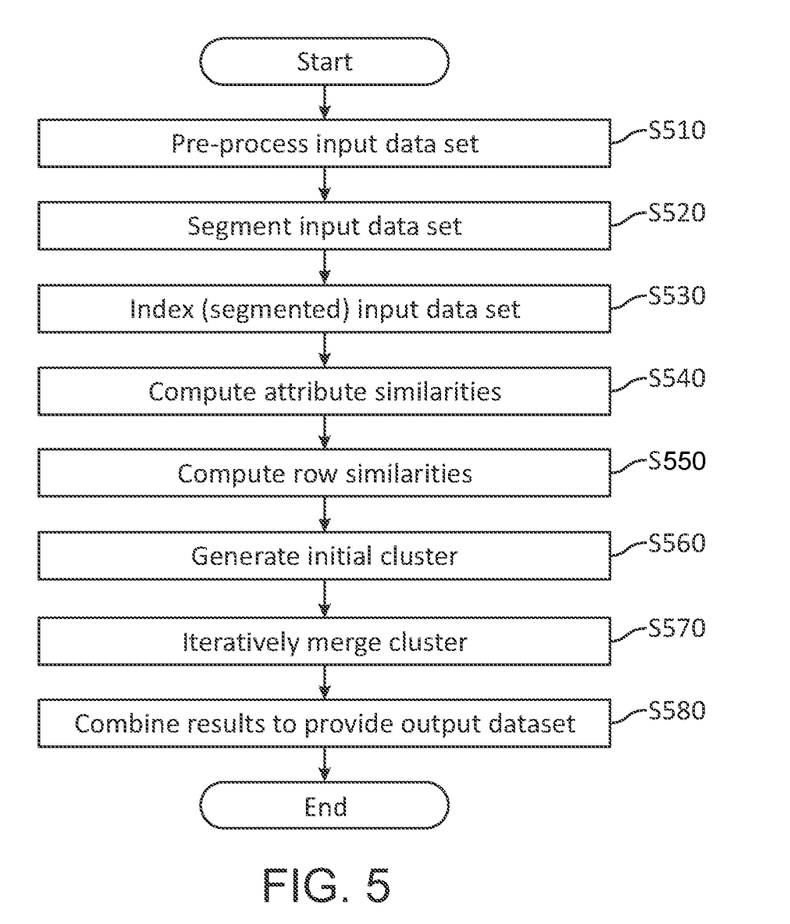
FIG. 5 is a flowchart illustrating a method for data entry de-duplication, according to an embodiment.

FIG. 5 is an example flowchart 500 illustrating a data entry de-duplication process according to an embodiment.

At S510, pre-processing of the input data set is performed. In an embodiment, S510 includes standardizing the input data set into a predefined and unified format that can be processed by the system 300. The input data set standardization requires removing exactly-matched rows duplicated, that is, rows containing identical attributes across multiple rows, and assigning each row with a unique RowID. In an embodiment, the data may be encoded into a predefined format and all characters may be converted to lowercase. The predefined format may include, for example, a UTF-8 format, and the like.

In an embodiment, a predefined number of attributes, such as, as an example and without limitation, twenty, are selected for the for analysis. The selection may be based on attributes being identified by users as informative. For example, InvoicePaidFlag is not as informative as LastName and City. Typically, attributes, or columns, that have very few unique values (i.e., a low cardinality) are selected. For example, a Yes/No flag may be a distinguishable attribute, as many entries may have the same value.

At the optional S520, the normalized data is segmented. In an embodiment, S520 includes identifying a simple rule that can segment the input data set, such as a normalized input data set, into exclusive subsets that can be evaluated independently. S520 allows for reducing of the number of rows, N, for which each segment may be compared. This further reduces the overall algorithm complexity, which is proportional to N. In an embodiment, since segments are independent, all segments can be run simultaneously in parallel. An example of a segmentation rule is to split data into different segments based on the first character of the last name. Entries with a last name starting with "A" are highly unlikely to need to be compared with entries with a last name starting with "B." Different segmentation strategies can be used on different datasets.

At S530, the input data set is indexed. In an embodiment, the indexing is performed by a full-text search engine. An example for such a search engine includes Elasticsearch. This requires generating a unique RowID as a document identifier in the search engine. This further includes storing each attribute for specific searches. In an embodiment, different indexes are created for different segments. The indexed name identifies the segment ID.

At S540, attribute similarities are computed. Attribute similarities are computed on each column and are computed across each pair of rows. In an embodiment, depending on the type of column, different comparators are applied, such as, as examples and without limitation, "EXACT," whereby the pair of rows is similar if they match character-by-character on the column. Examples for fuzzy matching comparators include "FUZZY-LH," whereby the pair of rows match if they have low Levenshtein distance, "FUZZY-RELEVANCE," whereby the pair of rows match if they have high relevance under term frequency-inverse document frequency (TF/IDF)-based scoring, and "FUZZY-PHONETIC-NG RAMS," whereby the pair of rows have similar matching ratings based on techniques such as tagging algorithms. A "WEIGHTED-VECTOR" can also be applied to assign different weights based on the location of a string. For example, in phone numbers, the first few digits might be more important than the rest, as they represent country code and area code. It should be noted that other types of comparators can be equivalently used.

In an embodiment, S540 includes a memorization process in which values that were involved in prior comparisons, as inputs or outputs, and the results are saved and the evaluation of all such future comparisons are skipped. For example, in fuzzy similarity comparisons everything is indexed by a full-text search engine to form a deterministic finite automaton (DFA) fast internal lookup structure for relevance search. Subsequently, sequential iteration through each row "X" occurs on this attribute, as well as querying the index for all entries relevant to row X. The index returns a set of row Ys. "X" is treated for all involved values of Yi, a single element amount Ys, as a group of related rows and generated combinations of pairs. For each pair, a similarity score is computed. All of the resulting pairs and similarity scores are saved.

On the next iteration, if row is one that has been seen before in any prior X or Y, the prior similarity results are returned to skip search and similarity calculations.

In an embodiment, S540 further includes generating in-memory indices when possible. For example, in exact similarity matches, all unique values are indexed and create a data structure having a unique value. This data structure is then used to compute and look up the similarity of two row attributes.

At S550, row similarities are computed. Row-to-row similarity is the sum of the weighted attribute similarities. Only row-to-row similarities above a minimum threshold are stored to optimize memory usage. The weights for computing similarities may be set by the user or through a machine learning algorithm. In an example embodiment, the similarities are computed using the following equation:

$$x = \frac{\sum_{i=1}^{n}(x_i * w_i)}{\sum_{i=1}^{n} w_i}$$

In the above equation, "w" is the weight assigned for column, "$\bar{x}$" is the attribute similarity, and "x" is the respective attribute. The weights may be determined using, for example, unsupervised machine learning models.

At S560, initial clusters are generated. The row-to-row similarities allow for the creation of a graph of rows (i.e., graphical representation of data set) that explicitly represent possible rations among clusters. With this initial graph of rows as nodes and row-to-row-similarity as edges, an initial clustering using a greedy algorithm is performed. This algorithm may include, without limitation sorting by pairs in descending order of the row-to-row similarity, searching down a sorted list, for pair (X, Y) on a list, if X and Y have not been assigned to a cluster, assigning X and Y to the same new cluster, if X has been assigned a cluster and Y has not, assigning Y to the same cluster as X, if Y has been assigned a cluster and X has not, assign X to the same cluster as Y, and, if X and Y are already assigned a cluster, do nothing.

Any remaining rows, which are completely isolated rows that have no substantially similarity to other rows, are assigned their own cluster. That is, each such row will be a cluster.

It should be noted that all rows are assigned an initial cluster. In an embodiment, cluster-related statistics are generated. To this end, for each cluster, a cluster anchor is identified. This is the reference row defined as the row that has the most connections with other rows in the cluster. For each row of the cluster, the row-to-row similarity is measured with the cluster anchor. This is used to determine the confidence of this row belonging to this cluster.

At S570, clusters that are substantially related are iteratively merged. The number of iterations is limited by the predefined maximum number of iterations or when the cluster assignment process is converged, such as when no change in clusters exists between iterations.

In each iteration, one cluster is measured against another cluster using a cluster signature. The cluster signature can be a combination of a cluster anchor, such as may be a default case, a cluster ID, and a neighbor vector. A neighbor vector includes rows that are part of the cluster in addition to rows that are "N" hops away, in the graph, from rows within this cluster. In an embodiment, cluster-to-cluster similarities are computed based on distances between cluster signatures, and a greedy algorithm is applied on cluster-to-cluster similarities to merge clusters.

At S580, the clustering results are combined to provide the output data set. The visualized representation of the same is provided. S580 may include an automation script that applies clustering to all segments. S580 may also include generating summary statistics and diagnostics for the results. Example formats for an output data set is shown in FIGS. 4A and 4B.

In an embodiment, to improve the clustering, the weight assignments of attributes are re-learned by evaluating "GOOD" row-to-row pairs and "BAD" pairs. "GOOD" pairs represent true duplications, and "BAD" pairs are false duplications, such as not-substantially-duplicated entities. In an embodiment, the feedback ideally comes from users. In a bootstrap mode, "GOOD" vs "BAD" are assigned as follows, with "GOOD" pairs having row similarity higher than a first value, and "BAD" pairs having row similarity lower than a second value. The first value, second value, or both, may be a range. In an example embodiment, the first value is seven-tenths, and the second value is between one-tenth and one-half.

The feedback allows for the creation of a training dataset for machine learning (ML) algorithms, and one or more techniques are used to discover patterns for assigning optimal weights among attributes. The set of patterns is determined using a set of supervised machine learning and deep learning models, such as, as examples and without limitation, random forest, logistic regression, neural networks, and the like, as well as any combination thereof. In an example embodiment, an ordinary least square (OLS) solver is used to treat training datasets as linear sets of equations. Ensemble techniques may be applied to combine the above outputs with human input, such as user feedback, to create consolidated weight assignment.

In an embodiment, a user can explicitly specify the types of comparator that can be applied to an attribute, such as "fuzzy" or "exact". The user can also override weights suggested by the machine learning for the attribute and specify an explicit weight, such as to allow greater emphasis on attributes named LastName or City. The user can also control the aggressiveness of the deduplication by requiring duplicates to have minimum similarities.

In another embodiment, a user can also override any identified duplications. A user input can be utilized to update a whitelist and blacklist. The whitelist specifies a pair of rows that are definitely duplicated, and the blacklist specifies pair of rows that are definitely not duplicated.

In addition, a ML algorithm collects user feedback to help it automatically suggest and assign weights to attributes based on a data set. Confirmed and rejected results may be used to retrain a model. Machine learning algorithms which can be utilized may include, without limitation, unsupervised machine learning algorithm.

It should be noted that the input data set for identifying duplicated entries can be retrieved from a single source or multiple sources. The latter may be, for example, different departments of the same organization. For example, for a finance department, prior marketing campaigns, subscriber lists, and a particular customer may be uniquely identified, even if they are represented in a different way.

Figure 6:
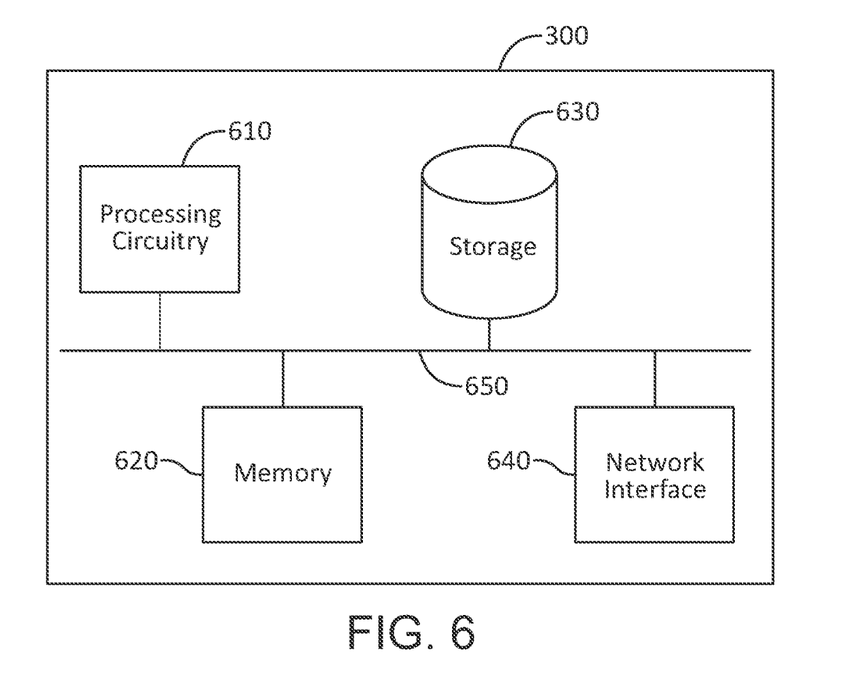
FIG. 6 is a block diagram of the system for deduplicating data entries in a database source.

FIG. 6 is an example schematic diagram of the system 300, according to an embodiment. The system includes a processing circuitry 610 coupled to a memory 620, a storage 630, and a network interface 640. In an embodiment, the components of the system 300 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read-only memory, flash memory, etc.), or a combination thereof.

In one configuration, software for implementing one or more embodiments disclosed herein may be stored in the storage 630. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 640 allows the system 300 to communicate with the various components, devices, and systems described herein for database entries de-duplication and for other, related, purposes.

It should be understood that the embodiments described herein are not limited to the specific architecture illustrated in FIG. 6, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for data entries deduplication, comprising:
indexing an input data set, wherein the input data set is in a tabular format and the indexing includes providing a unique Row identifier (RowID), wherein rows are the data entries;
standardizing the input data set into a predefined and unified format;

segmenting the standardized input data set, wherein each segment includes a subset of the rows included in the input data set;

indexing each segment using a text search engine;

computing attribute similarity for each column across each pair of rows;

computing, for each pair of rows, row-to-row similarity as a weighted sum of attribute similarities;

clustering pairs of rows based on their row-to-row similarities;

determine clusters that are substantially related based on a cluster signature;

iteratively merging clusters that are substantially related;

providing an output data set including at least the clustered pairs of rows; and wherein the output data set further includes the input data set, a cluster identification indicating the deduplicated group to which a corresponding row belongs, a cluster anchor information including the RowID, and a confidence score indicating a confidence or likelihood that the row belongs to the cluster.

2. The method of claim 1, wherein computing attribute similarity further comprises:

utilizing a comparator based on a type of an attribute to compute the attribute similarity, wherein the comparator is any one of: exact matching and fuzzy matching.

3. The method of claim 2, wherein row-to-row similarity demonstrates pairs of rows are similar, and wherein the weights are determined based on a machine learning model.

4. The method of claim 1, wherein clustering the pairs of rows further comprises:

generating a graph including nodes and edges, wherein the nodes represent rows and edges represent the row-to-row similarities; and applying a greedy algorithm on the graph to cluster rows, wherein each cluster includes at two similar data entries.

5. The method of claim 4, wherein the clustering results in isolated rows, wherein each isolated row is individually clustered.

6. The method of claim 4, wherein the format of the output data set is any one of: a table and a graph.

7. The method of claim 6, wherein the input data set is sourced from a plurality of data sources.

8. The method of claim 4, wherein the cluster signature is a combination of a cluster anchor, a cluster ID, and a neighbor vector, where the cluster anchor is the row that has the most connections with other rows in a particular cluster, and where the neighbor vector includes rows that are part of the particular cluster in addition to rows that are "N" hops away, "N" being a non-negative integer, in the generated graph, from rows within the particular cluster.

9. A non-transitory computer readable medium having stored thereon instructions for causing a processing circuitry to perform a process method for data entries deduplication, the process comprising:

indexing an input data set, wherein the input data set is in a tabular format and the indexing includes providing a unique row identifier (ID);

standardizing the input data set into a predefined and unified format;

segmenting the standardized input data set, wherein each segment includes a subset of the rows included in the input data set;

indexing each segment using a text search engine;

computing attribute similarity for each column across each pair of rows;

computing, for each pair of rows, row-to-row similarity as a weighted sum of attribute similarities;

clustering pairs of rows based on their row-to-row similarities;

determine clusters that are substantially related based on a cluster signature;

iteratively merging clusters that are substantially related;

providing an output data set including at least the clustered data entries and clustered data entries; and wherein the output data set further includes the input data set, a cluster identification indicating the deduplicated group to which a corresponding row belongs, a cluster anchor information including the RowID, and a confidence score indicating a confidence or likelihood that the row belongs to the cluster.

10. The non-transitory computer readable medium according to claim 9, wherein the process further comprises:

generating a graph including nodes and edges, wherein the nodes represent rows and edges represent the row-to-row similarities; and applying a greedy algorithm on the graph to cluster rows, wherein each cluster includes at two similar data entries, wherein the cluster signature is a combination of a cluster anchor, a cluster ID, and a neighbor vector, where the cluster anchor is the row that has the most connections with other rows in a particular cluster, and where the neighbor vector includes rows that are part of the particular cluster in addition to rows that are "N" hops away, "N" being a non-negative integer, in the generated graph, from rows within the particular cluster.

11. A system for data entries deduplication, comprising:

a processing circuitry; and a memory, the memory containing instructions that, when executed by the processing circuitry, configure the system to:

index an input data set, wherein the input data set is in a tabular formant and the indexing includes providing a unique row identifier (ID);

standardize the input data set into a predefined and unified format;

segment the standardized input data set, wherein each segment includes a subset of the rows included in the input data set;

index each segment using a text search engine;

compute attribute similarity for each column across each pair of rows;

compute, for each pair of rows, row-to-row similarity as a weighted sum of attribute similarities;

cluster pairs of rows based on their row-to-row similarities;

determine clusters that are substantially related based on a cluster signature;

iteratively merge clusters that are substantially related;

provide an output data set including at least the clustered data entries and clustered data entries; and wherein the output data set further includes the input data set, a cluster identification indicating the deduplicated group to which a corresponding row belongs, a cluster anchor information including the RowID, and a confidence score indicating a confidence or likelihood that the row belongs to the cluster.

12. The system of claim 10, wherein the system is further configured to:

utilize a comparator based on a type of an attribute to compute the attribute similarity, wherein the comparator is any one of: exact matching and fuzzy matching.

13. The system of claim 12, wherein row-to-row similarity demonstrates pairs of rows are similar, and wherein the weights are determined based on a machine learning model.

14. The system of claim 11, wherein the system is further configured to:
generate a graph including nodes and edges, wherein the nodes represent rows and edges represent the row-to-row similarities; and
apply a greedy algorithm on the graph to cluster rows, wherein each cluster includes at two similar data entries.

15. The system of claim 14, wherein the format of the output data set is any one of: a table and a graph.

16. The system of claim 15, wherein the input data set is sourced from a plurality of data sources.

17. The system of claim 14, wherein the cluster signature is a combination of a cluster anchor, a cluster ID, and a neighbor vector, where the cluster anchor is the row that has the most connections with other rows in a particular cluster, and where the neighbor vector includes rows that are part of the particular cluster in addition to rows that are "N" hops away, "N" being a non-negative integer, in the generated graph, from rows within the particular cluster.

* * * * *